United States Patent
Coffman

(10) Patent No.: US 7,255,138 B2
(45) Date of Patent: Aug. 14, 2007

(54) FUEL BIB

(75) Inventor: Curtis Greg Coffman, 4193 Weisenberger, Lebanon, OH (US) 45036

(73) Assignee: Curtis Greg Coffman, Lebanon, OH (US)

(*) Notice: Subject to any disclaimer, the term of this patent is extended or adjusted under 35 U.S.C. 154(b) by 0 days.

(21) Appl. No.: 11/163,950

(22) Filed: Nov. 4, 2005

(65) Prior Publication Data

US 2007/0102059 A1 May 10, 2007

(51) Int. Cl.
*B65B 1/04* (2006.01)
(52) U.S. Cl. .............. 141/86; 141/391; 141/311 A
(58) Field of Classification Search ............ 141/86–89, 141/98, 311 A, 391; D12/190, 181
See application file for complete search history.

(56) References Cited

U.S. PATENT DOCUMENTS

| | | | |
|---|---|---|---|
| 2,467,001 A * | 4/1949 | Allen ..................... 280/850 |
| 2,659,523 A | 11/1953 | Comber ................... 226/129 |
| 4,817,691 A | 4/1989 | Lau ........................ 141/390 |
| 5,506,040 A * | 4/1996 | Cordani ................... 428/218 |
| D425,842 S * | 5/2000 | McNaughton ............ D12/190 |
| 6,463,966 B1 * | 10/2002 | Goodger ................... 141/86 |
| 6,481,478 B2 | 11/2002 | Mueller ................... 150/167 |
| 6,772,804 B1 | 8/2004 | Ryan ....................... 141/86 |
| 6,807,990 B1 * | 10/2004 | Hernandez et al. ....... 141/390 |

* cited by examiner

*Primary Examiner*—Steven O. Douglas
(74) *Attorney, Agent, or Firm*—R. William Graham

(57) ABSTRACT

A fuel bib which connects over and about gas tank filler tube door of a vehicle includes a semi-flexible plastic cover having an outer protective surface and an inner surface material which is made to removably adhere to the vehicle's body, a precut inner portion which is of a size and configuration substantially that of the gas tank filler tube door, wherein the precut inner portion, an outer remaining portion of the fuel bib surrounding the precut inner portion is intended to remain on the vehicle surrounding the fuel door, and at least one detachable portion interconnecting the precut inner portion and the outer remaining portion.

8 Claims, 4 Drawing Sheets

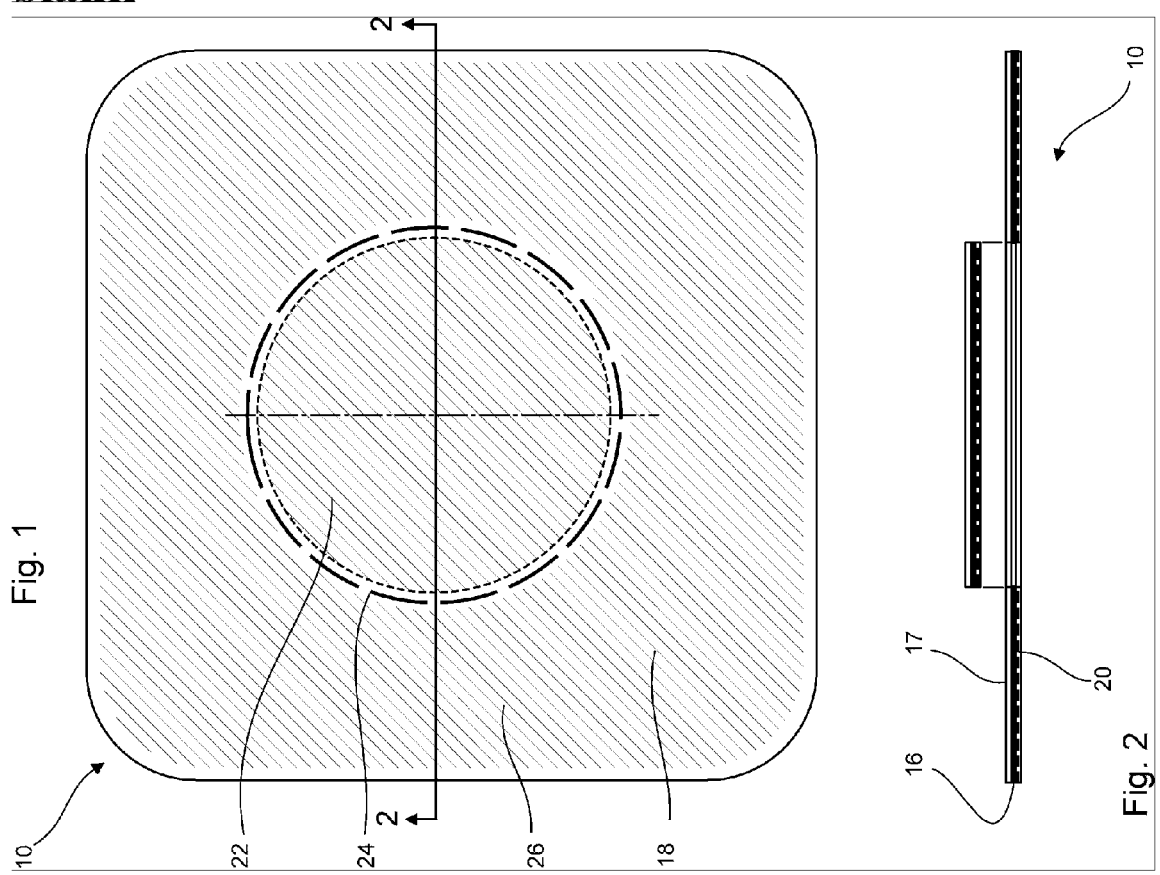

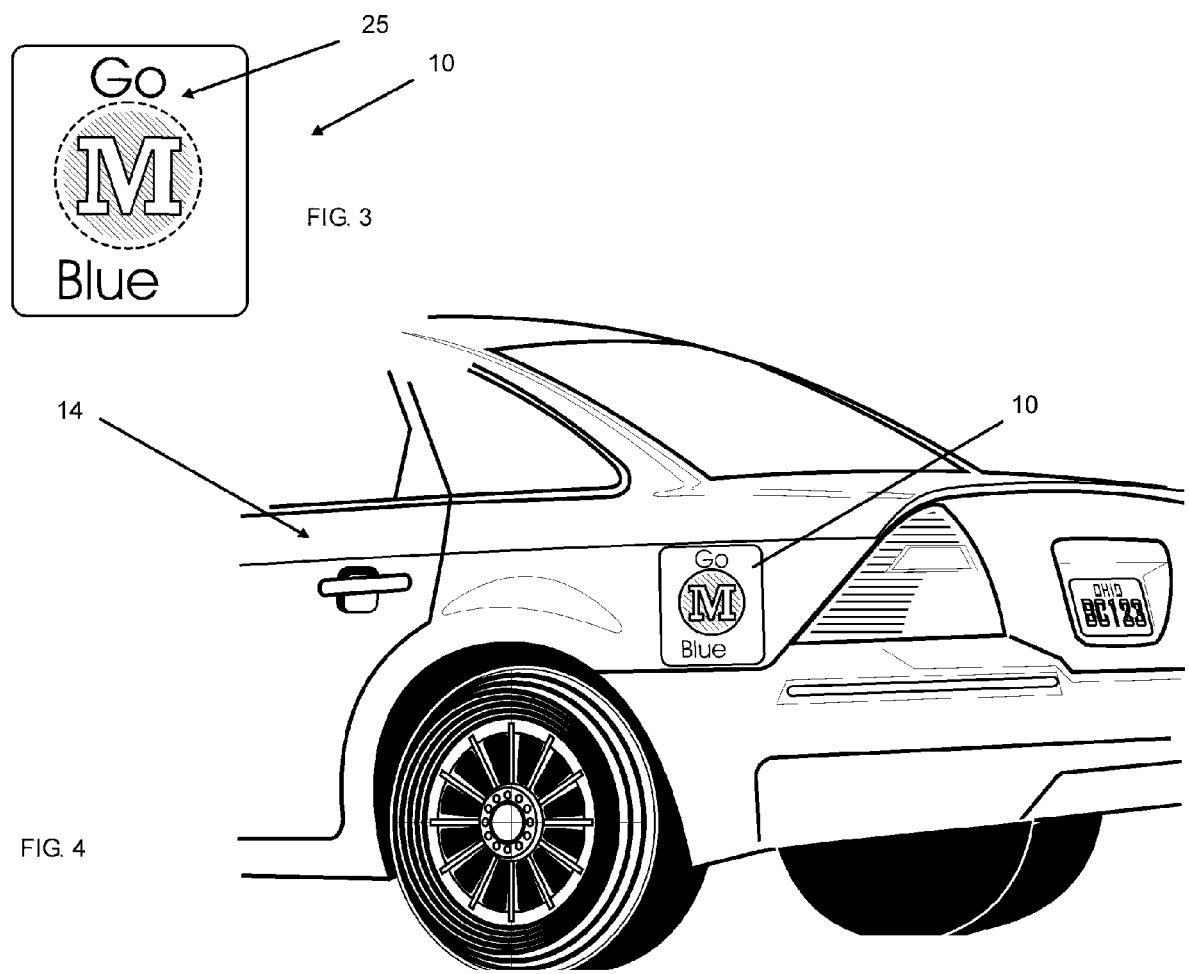

FUEL BIB

BACKGROUND OF THE INVENTION

1. Field of the Invention

The present invention relates generally to auto body protection and more specifically to a fuel bib for protecting a part of a vehicle body surrounding the gas tank filler tube which prevents gasoline and/or the fuel nozzle from damaging the finish on the body.

2. Discussion of the Prior Art.

There appears to be many commercially available devices exist for temporarily covering the top surface of part of a vehicle body about a gas tank filler tube for use when filling a gas tank with gasoline. The current art typically uses a temporary foldable device which covers part of the vehicle's body about the gas tank filler tube. Others disclose nonfoldable protective bibs used to cover a part of the vehicle's body.

While there are many such prior devices, there remains a need to improve the art. Accordingly, there is a clearly felt need in the art for a vehicle fuel bib which is affixable to the vehicle's body covering only a portion of a body surrounding a gas tank filler tube, which can optionally remain adhered to the vehicle surface in a semi-permanent manner such that the vehicle can be driven without risk of loss of the bib and yet the bib may be easily manually removed without tools.

SUMMARY OF THE INVENTION

It is an object to improve fuel bibs.

It is another object to provide a fuel bib having improved connection to a vehicle's body.

Still another object is to enhance the vehicle's appearance while protecting an area of the body which is subject to frequent abuse.

It is an object to provide a fuel bib which may be attached to a vehicle body without tools.

It is an object to provide a fuel bib which serves as a body protectant.

Accordingly, the present invention is directed to a fuel bib which connects over and about gas tank filler tube door of a vehicle. The fuel bib cover can include a semi-flexible plastic which serves as an outer surface and which can preferably include a permanent print receptive surface. The fuel bib can include an inner surface material which is made to removably adhere to the vehicle's body. In a preferred embodiment, the inner surface can be substantially coated with a thin magnetic material. In another embodiment, the inner surface can be coated with a tacky adhesive. The outer surface can preferably include a scratch resistant material. The fuel bib includes a precut inner portion which is of a size and configuration substantially that of the gas tank filler tube door, wherein the precut inner portion interconnects via at least one detachable portion to an outer remaining portion of the fuel bib which is intended to remain on the body surface surrounding the fuel door.

The fuel bib can preferably used in the following manner. The fuel bib is placed over the fuel door such that the precut inner portion is substantially positioned over the fuel door. Then, the gas tank filler tube door cover can be moved to an open position by lifting an outer edge of the fuel bib while pressing down on the precut inner portion causing the outer remaining portion to detach from the precut inner portion. Once detached, the outer remaining portion can be repositioned onto the vehicle's body and oriented about the precut inner portion in a manner as prior to detachment using the detachment points as alignment aids. In this way, any aesthetic design printed on the outer surface of the cover is in register. The semi-flexible nature of the bib provides for a uniform smooth finish.

The fuel bib provides a unique and easy to install protective device which can be left on the vehicle for a significant time, removing the same only when desired such as when washing the car. At such time the removable nature, i.e., magnetic or tacky backing, enables the bib to be removed and quickly reattached.

These and additional objects, advantages, features and benefits of the present invention will become apparent from the following specification.

BRIEF DESCRIPTION OF THE DRAWINGS

FIG. 1 is a plan view of a fuel bib in accordance with the present invention.

FIG. 2 is a cross sectional view of the fuel bib showing components detached from one another.

FIG. 3 illustrates a fuel bib in accordance with the invention showing an aesthetic design thereon.

FIG. 4 illustrates a first mode of application of the fuel bib showing installation on a vehicle in a closed mode.

DETAILED DESCRIPTION OF THE PREFERRED EMBODIMENTS

Figure 5:
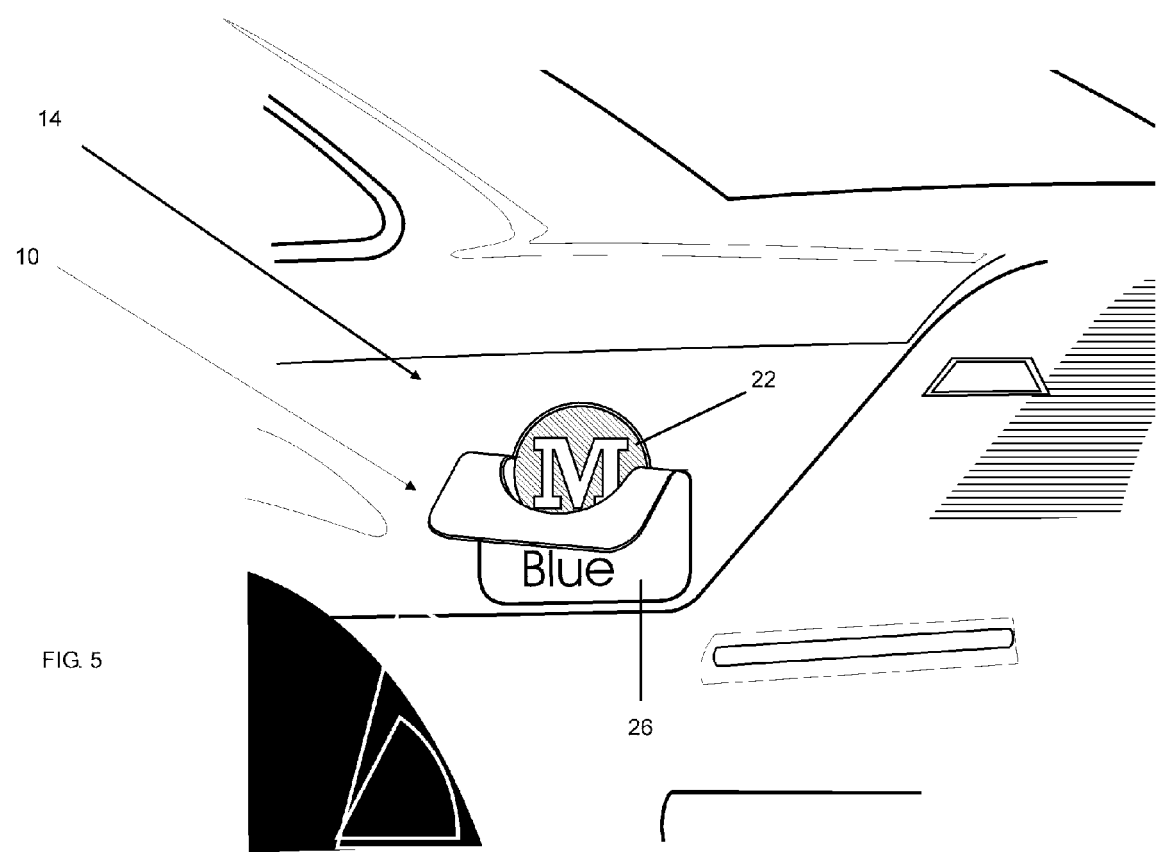
FIG. 5 illustrates a second mode of application of the fuel bib installation wherein perforations are separated by physical separation of parts of the bib.

Referring now to the drawings, the fuel bib of the present invention is generally referred to by the numeral 10. The fuel bib 10 connects over and about gas tank filler tube door 12 of a vehicle 14. The fuel bib 10 can include a semi-flexible cover 16 having a protective outer surface 17 and which can preferably include a permanent print receptive surface 18. The cover can be made of plastic, rubber or synthetic material. The fuel bib 10 can include an inner surface material 20 which is made to removably adhere to the body of the vehicle 14. In a preferred embodiment, the inner surface 20 can be substantially coated with a thin magnetic material. In another embodiment, the inner surface 20 can be coated with a tacky adhesive. Optionally, the adhesive material and the magnetic material can be used in various ways, such as to bond the magnetic material to the cover 16 and/or as a backing to further aid the magnetic material to bond to the vehicle 14. The outer surface 17 can preferably include a scratch resistant material.

The fuel bib 10 includes a precut inner portion 22 which is of a size and configuration substantially that of the gas tank filler tube door 12, wherein the precut inner portion 22 is interconnects via at least one detachable portion 24 to an outer remaining portion 26 of the fuel bib 10 is intended to remain on the body surface of the vehicle 14 surrounding the fuel door 12.

Figure 6:
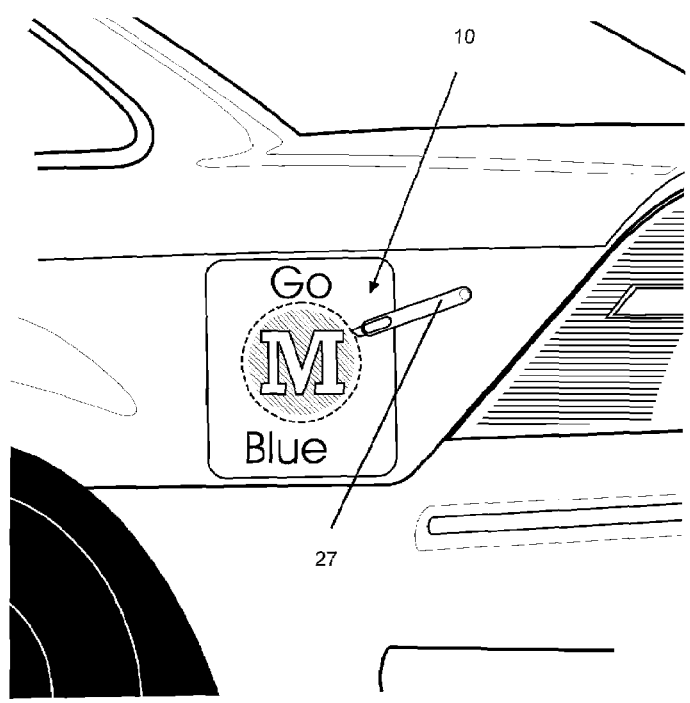
FIG. 6 illustrates yet mode of application of the fuel bib wherein perforations are broken with the aid of a stencil and knife.
Figure 8:
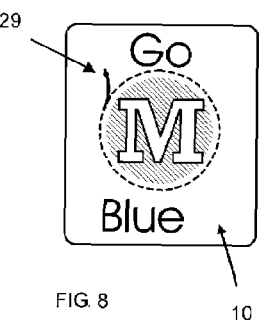
FIG. 8 illustrates yet another embodiment wherein components of the fuel bib can be separated by a pull string.
Figure 7:
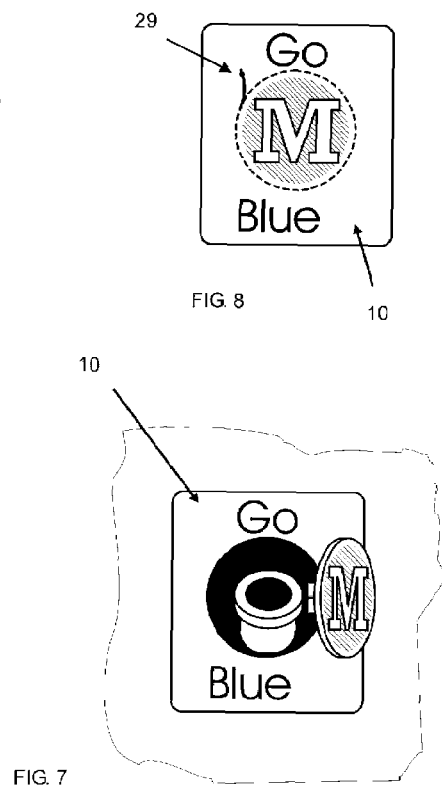
FIG. 7 illustrates the fuel bib installed in an open mode.

The fuel bib 10 can preferably used in the following manner. The fuel bib 10 is placed over the fuel door 12 such that the precut inner portion 22 is substantially positioned over the fuel door 12. Then, the gas tank filler tube door 12 can be moved to an open position by lifting an outer edge of the fuel bib 10 while pressing down on the precut inner portion 22 causing the outer remaining portion 26 to detach from the precut inner portion 22. Once detached, the outer remaining portion 26 can be repositioned onto the body of the vehicle and oriented about the precut inner portion 22 in a manner as prior to detachment using the detachment points 24 as alignment aids. In this way, an aesthetic design 25 can be printed on the outer surface 16 is in register. FIGS. 6 and 8 illustrate two other applications wherein a stencil-knife 27 can be used to separate the inner portion 22 and outer remaining portion 26 or a pull string 29. The fuel bib 10 can preferably be of a thickness of about 50 to 200 mils to provide the semi-flexible nature of the fuel bib 10 which enables user friendly installation and provides for a uniform smooth finish.

The fuel bib 10 provides a unique and easy to install a protective device which can be left on the vehicle for a significant time, removing the same only when desired such as when washing the car. At such time, the removable nature, i.e., magnetic or tacky backing, enables the fuel bib 10 to be removed and quickly reattached.

The particular geometry of the precut inner portion 22 and remaining outer portion 26 the can have a suitable shape to conform to the particular vehicle to which the bib 10 is applied. The scratch resistant cover 16 can be a vinyl or polyvinyl. The cover 16 can also preferably be fabricated in a manner to include a print receptive material capable of receiving aesthetic indicia thereon, such as a team logo. Thus, by virtue of the above features, a user will be inclined to leave the fuel bib 10 in place serving a dual purpose of protecting the body of the vehicle 14 as well as displaying a message of support for one's team, for example. The scratch resistant material is one which does not react with gasoline.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

What is claimed is:

1. A fuel bib adapted to connect over and about a gas tank filler tube door of a vehicle's body, said fuel bib comprising:
   a semi-flexible cover having an outer protective surface and an inner surface material which is made to removably adhere to the vehicle's body, a precut inner portion which is of a size and configuration substantially that of the gas tank filler tube door, and
   an outer remaining portion of said fuel bib surrounding said precut inner portion which is intended to remain on the vehicle body surrounding the fuel door and at least one detachable portion interconnecting said precut inner portion and said outer remaining portion.

2. The fuel bib of claim 1, wherein said cover includes one of a plastic material, rubber material and synthetic material.

3. The fuel bib of claim 1, wherein said inner surface is substantially coated with a magnetic material.

4. The fuel bib of claim 1, wherein said inner surface is coated with a tacky adhesive.

5. The fuel bib of claim 1, wherein said outer protective surface includes a scratch resistant material.

6. The fuel bib of claim 1, wherein said fuel bib includes a permanent print receptive surface.

7. The fuel bib of claim 1, wherein said fuel bib includes an aesthetic design printed thereon which is sectioned between said precut inner portion and said outer remaining portion.

8. The fuel bib of claim 1, wherein said fuel bib includes means for registering said precut inner portion and said outer remaining portion.

\* \* \* \* \*